(12) United States Patent
Sabi et al.

(10) Patent No.: US 7,468,200 B2
(45) Date of Patent: Dec. 23, 2008

(54) WRITE ONCE OPTICAL RECORDING MEDIUM

(75) Inventors: Yuichi Sabi, Miyagi (JP); Etsuro Ikeda, Miyagi (JP); Mitsuaki Oyamada, Kanagawa (JP)

(73) Assignee: Sony Corporation (JP)

( * ) Notice: Subject to any disclaimer, the term of this patent is extended or adjusted under 35 U.S.C. 154(b) by 152 days.

(21) Appl. No.: 11/372,699

(22) Filed: Mar. 10, 2006

(65) Prior Publication Data
US 2006/0246249 A1 Nov. 2, 2006

(30) Foreign Application Priority Data
Mar. 10, 2005 (JP) .............................. 2005-068210

(51) Int. Cl.
*B32B 3/02* (2006.01)
(52) U.S. Cl. .................... 428/64.1; 428/64.4; 428/64.5; 430/270.12
(58) Field of Classification Search ................ 428/64.1, 428/64.4, 64.5, 64.6; 430/270.12, 270.13
See application file for complete search history.

(56) References Cited

U.S. PATENT DOCUMENTS

| | | | |
|---|---|---|---|
| 5,733,623 A * | 3/1998 | Raychaudhuri et al. .... | 428/64.1 |
| 6,040,066 A * | 3/2000 | Zhou et al. ................... | 428/641 |
| 6,445,675 B1 * | 9/2002 | Ebina et al. ............... | 369/275.2 |
| 6,610,380 B2 * | 8/2003 | Kitaura et al. ............. | 428/64.1 |
| 6,713,148 B1 * | 3/2004 | Hsu et al. ................... | 428/64.1 |
| 7,057,252 B2 * | 6/2006 | Uno et al. ................... | 257/432 |
| 2004/0067332 A1 * | 4/2004 | Hsu et al. ................... | 428/64.4 |
| 2005/0082162 A1 * | 4/2005 | Uno et al. .............. | 204/192.26 |
| 2005/0253210 A1 * | 11/2005 | Uno et al. ................... | 257/432 |

FOREIGN PATENT DOCUMENTS

| JP | 11-144316 A | 5/1999 |
|---|---|---|
| JP | 2004-291490 | 10/2004 |

* cited by examiner

*Primary Examiner*—Elizabeth Mulvaney
(74) *Attorney, Agent, or Firm*—Lerner, David, Littenberg, Krumholz & Mentlik, LLP

(57) ABSTRACT

A write once optical recording medium has an inorganic recording film which includes an oxide film having germanium oxide (GeO) as a principal component, and a metal film adjacent to the oxide film, the metal film having a titanium/silicon alloy (TiSi) as a principal component. According to this arrangement, it is possible to construct an inexpensive write once optical recording medium with large strength capable of high density recording by using a short wavelength light source and an optical system with a high numerical aperture having excellent characteristics.

5 Claims, 7 Drawing Sheets

Table 1

| Film Thickness of First Dielectric Film (x) | Film Thickness of Second Dielectric Film (y) | Leading Jitter | Trailing Jitter |
|---|---|---|---|
| 43nm | 0nm | 5.0% | 5.6% |
| 38nm | 10nm | 4.8% | 5.6% |
| 33nm | 15nm | 5.0% | 5.6% |
| 28nm | 20nm | 5.1% | 6.0% |
| 23nm | 28nm | 5.7% | 5.9% |
| 10nm | 35nm | 6.5% | 6.5% |
| 0nm | 60nm | 7.0% | 7.0% |

Jitter Values Obtained When Arrangements of Dielectric Films Were Changed in Inventive Example 2

Film Arrangement of Inventive Example 3

Film Arrangement of Inventive Example 4

Table 2

| Oxygen Concentration x | Leading jitter | Trailing jitter |
|---|---|---|
| 1.22 | 6.90% | 7.00% |
| 1.33 | 6.50% | 6.55% |
| 1.52 | 6.20% | 6.30% |
| 1.80 | 5.70% | 6.00% |
| 2.11 | 6.00% | 6.30% |
| 2.20 | 6.40% | 6.55% |
| 2.30 | 7.10% | 7.30% |
| 2.44 | 9.00% | 9.00% |

Jitter Values Obtained When Oxygen Concentration of $Ge_1O_x$ was Changed in Inventive Example 5

FIG. 10

Table 3

| Film Thickness of TiSi Layer | Film Thickness of $Ge_1O_x$ Layer | Leading Jitter | Trailing Jitter |
|---|---|---|---|
| 25nm | 16nm | 5.5% | 6.1% |
| 22nm | 18nm | 5.3% | 5.3% |
| 20nm | 20nm | 5.3% | 5.6% |
| 27nm | 22.5nm | 4.8% | 4.9% |

Jitter Values Obtained When Film Thickness of Metal Film and Oxide Film Were Changed in Inventive Example 5

WRITE ONCE OPTICAL RECORDING MEDIUM

CROSS-REFERENCE TO RELATED APPLICATIONS

The present application claims priority from Japanese Patent Application No. JP 2005-068210 filed on Mar. 10, 2005, the disclosure of which is hereby incorporated by reference herein.

BACKGROUND OF THE INVENTION

The present invention relates generally to a write once optical recording medium, and particularly to a write once optical recording medium including an inorganic recording film.

The mainstream of write once optical recording mediums is a write once optical recording medium including a recording film on which organic dye is spin-coated, such as a write once CD (Compact Disc) and a write once DVD (Digital Versatile Disc) as is known as so-called CD-R (Compact Disc-Recordable) and DVD-R (Digital Versatile Disc-Recordable).

Also, there is proposed a storage member including an inorganic recording medium which may meet with the requirements of the CD-R, for example (see Japanese Published Patent Application No. 11-144316, for example).

On the other hand, a blue-ray disc (Blu-ray Disc, BD) which receives a remarkable attention as a next-time optical recording medium is able to realize higher-density information recording and high-vision video recording (high-definition video recording).

The first BD recording apparatus has already been commercially available on the market and this BD recording apparatus may meet with the requirements of the rewritable media using a phase-change material as the recording layer.

It is, however, desired that BD write once media (BD-R) should be requested as the needs of the market and that such BD write once media should become inexpensive as compared with the rewritable media.

According to the standards of the first BD, since the first BD uses the phase-change material as the base material thereof, if the BD-R is designed using inorganic material from the viewpoint of media characteristics such as a push-pull signal recording sensitivity, then it is easy to match the characteristics of the BD-R.

Alternatively, the BD-R may use the phase-change material as the base material thereof and this BD-R is designed so that it is made unable to be re-recorded, whereafter it may meet with the standards of the BD-R. However, according to this arrangement, the BD-R should be initialized. Further, since the film arrangement, the number of films and the materials of this BD-R become equivalent to those of the rewritable media, it is difficult to decrease the cost and it is also difficult to realize inexpensive media.

Above all, the element that considerably affects the cost of the BD-R is the number of films. Therefore, if the number of the films is decreased, then equipment investment of a vacuum evaporation system to deposit films by a sputtering method can be decreased considerably, which may reflect decrease of media cost.

Accordingly, the number of films should preferably be decreased as much as possible and it is desirable that an optical recording medium including three or four layers of which number of lesser than that of the phase-change media should be realized.

In the BD media, the surface from which information may be read out is the opposite side of a substrate, for example, the side of a thin light transmission layer having a thickness of 100 µm which serves as a film covering a recording film. A thickness of this light transmission layer is approximately 70 µm when the BD is a double-layer media. Further, if the standards of multi-layer media are completed, then the above thickness of the light transmission layer may be varied in accordance with the above standards. A range in which the above thickness of the light transmission layer is selected to be 10 µm to 177 µm may be considered as a satisfactory range from the standpoints of skew characteristics and recording and reproducing characteristics.

As methods for forming this light transmission layer, there have been proposed various methods such as a method of bonding a PC (polycarbonate) resin sheet by using a PSA (Pressure Sensitive Adhesive), a method of bonding the PC resin sheet by using a ultraviolet-curing resin, that is, so-called UV resin or a method of forming all of light transmission layers having a thickness of about 100 µm by the UV resin.

Of these methods, the PSA has small hardness as compared with that of the UV resin and hence it may exert large influence on skew characteristics and recording and reproducing characteristics depending on recording materials. Accordingly, stable recording materials and arrangements by which satisfactory recording may be made by using even the PSA are requested.

SUMMARY OF THE INVENTION

In view of the aforesaid aspects, the present invention provides a write once optical recording medium which can meet the above-mentioned requirements.

Also, the present invention provides a write once optical recording medium in which the number of films can be decreased so that the write once optical recording medium can be manufactured inexpensively.

Further, the present invention provides a write once optical recording medium in which a light transmission layer with large strength can be formed.

According to an aspect of the present invention, there is provided a write once optical recording medium including an inorganic recording film, the inorganic recording film including an oxide film having germanium oxide (GeO) as a principal component thereof; and a metal film adjacent to the oxide film and having a titanium/silicon alloy (TiSi) as a principal component thereof.

Also, according to the present invention, the titanium/silicon alloy TiSi has an Si composition of from 8 atomic % to 32 atomic %.

Also, according to the present invention, this write once optical recording medium further includes a first dielectric film disposed adjacent to the oxide film on a side opposite the metal film. The dielectric film may be formed of ZnS—SiO2.

Further, according to the present invention, the write once optical recording medium may further include a second dielectric film disposed adjacent to the first dielectric film on a side opposite the oxide film, the first dielectric film being formed of ZnS—SiO$_2$ and the second dielectric film being formed of SiN.

Furthermore, according to the present invention, the germanium oxide in the oxide film has the composition Ge$_1$O$_x$, where $1.3 \leq x \leq 2.2$.

As will become apparent from the descriptions which will be made later on, the write once optical recording medium according to the present invention can improve recording sensitivity and also can improve recording characteristics (that is, jitters can be decreased).

Further, since the first dielectric layer is made of ZnS—SiO$_2$, the S/N (signal-to-noise ratio) of a recording signal can be improved and satisfactory characteristics can be obtained.

BRIEF DESCRIPTION OF THE DRAWINGS

FIG. 10 is a table showing measured results of jitter values obtained when film thicknesses of a metal film and an oxide film were changed in the inventive example 5.

DETAILED DESCRIPTION

While the write once optical recording medium according to the embodiments of the present invention will be described below, it is needless to say that the present invention is not limited to the following embodiments.

Figure 1:
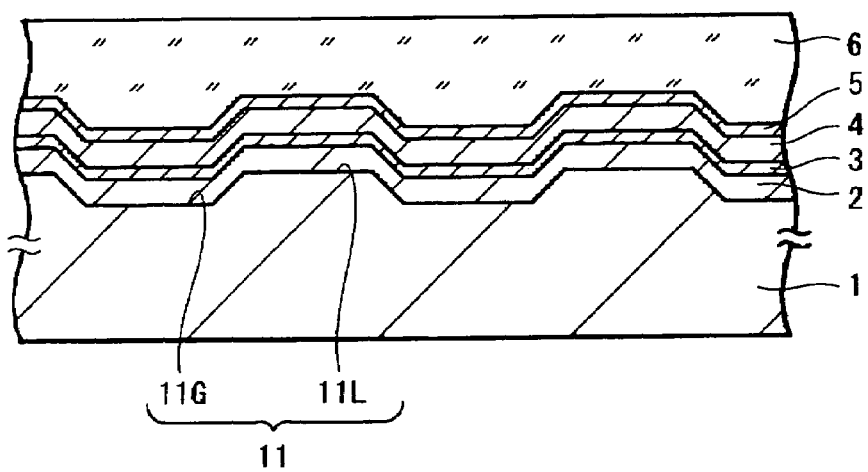
FIG. 1 is a schematic cross-sectional view showing a main portion of a write once optical recording medium according to an embodiment of the present invention.

FIG. 1 of the accompanying drawings is a schematic cross-sectional view showing a fundamental arrangement of a write once optical recording medium of BD (Blu-ray Disc), for example, corresponding to a blue ray disc according to the present invention.

In this case, as shown in FIG. 1, a metal film 2 and an oxide film 3 constructing an inorganic recording film are deposited on a substrate 1 such as a polycarbonate (PC) substrate and a glass substrate including an uneven surface 11 on which a groove 11G and a land 11L are formed. First and dielectric films 4 and 5 are deposited on the oxide film 3 and a light transmission layer 6 is formed on the second dielectric film 6.

The oxide film 3 is an oxide film of which principal component is germanium (Ge) oxide GeO. The metal film 2 adjacent to this oxide film 3 is formed of a metal film of which principal component is titanium silicon alloy TiSi.

An oxygen concentration of the germanium oxide GeO of the oxide film 3 is selected so as to satisfy:

$$1.3 \leq x \leq 2.2$$

where atomic composition is Ge$_1$O$_x$.

In the titanium silicon alloy TiSi of the metal film 2, the Si composition is selected to be larger than 8 atomic % and smaller than 32 atomic %.

Also, the first dielectric film 4 disposed on the surface opposite to the side in which the oxide film 3 is adjacent to the metal film 2 is made of ZnS—SiO$_2$.

The second dielectric film 5, that is, the second dielectric film 5 adjacent to the surface opposite to the side in which the first dielectric film 4 is adjacent to the oxide film 3 is made of SiN.

The light transmission layer 6 has a film thickness which falls within a range of from 10 μm to 177 μm.

Optical recording and reproduction for once recording this write once optical recording medium 10 is carried out by irradiating light from the side of the light transmission layer 6.

Illumination light has a wavelength which falls within a range of from 405 nm±5 nm, and a numerical aperture (N.A.) of the objective lens of the optical system is selected in a range of from 0.85±0.01.

Next, inventive examples of the write once optical recording medium according to the present invention will be described.

In any of the inventive examples, the write once optical recording disc is a BD (Blu-ray Disc) type write once optical recording medium, and an optical system for such write once optical recording medium is an optical disc recording and reproducing apparatus using a two-group objective lens with a numerical aperture of 0.85 and a blue semiconductor laser light source with a wavelength of 405 nm.

A test apparatus was a BD disc tester manufactured by Pulstec Industrial Co., Ltd under the trade name of "ODU-1000". A wavelength of light source was 405.2 nm.

Also, jitters were measured through an equalizer board manufactured by Pulstec Industrial Co, Ltd., by using a time interval analyzer manufactured by Yokogawa Electric Corporation under the trade name of "TA720".

Besides, amplitudes and degree of modulation were measured by using a digital oscilloscope manufactured by Tektronix under the trade name of "TDS7104".

Linear velocity for recording was 9.83 m/s (twice normal speed recording), linear velocity for reproduction was 4.92 m/s (one time normal speed) and a channel bit length was 74.50 nm (recording density was 25 GB on a 12 cm-optical disc).

A modulation system was 17PP, a mark length of 2T mark that is the shortest mark was 0.149 μm, a mark length of 8T mark was 0.596 μm and a track pitch was 0.32 μm.

EXAMPLE 1

Figure 2:
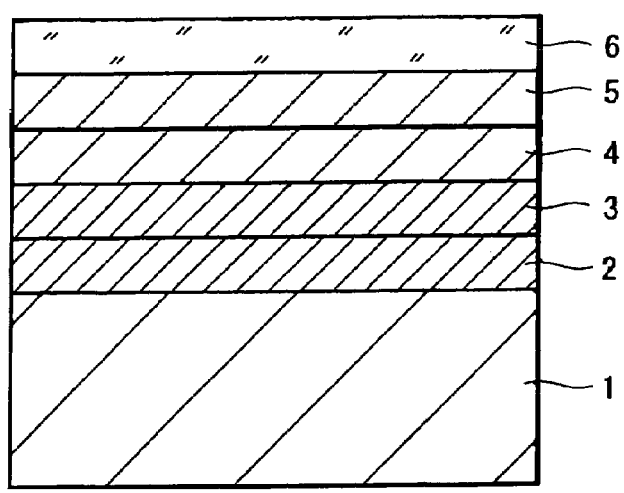
FIG. 2 is a diagram showing a film arrangement of a write once optical recording medium according to the embodiment of the present invention.

FIG. 2 is a diagram showing a film arrangement of a write once optical recording medium 10 in the inventive example 10.

In the write once optical recording medium 10 according to this inventive example 1, an uneven face 11 composed of grooves 11G and lands 11L was formed on a PC substrate 1 having a thickness of 1.1 mm as was already explained with reference to FIG. 1. A depth of this groove was 21 nm and a track pitch was 0.32 μm.

In the BD, the light illumination surface is the surface opposite to the opposite side of the substrate and a metal film 2 formed of an TiSi film having a thickness of 25 nm, a GeO oxide film 3 having a thickness of 22 nm, a first dielectric film 4 made of ZnS—SiO$_2$ having a thickness of 45 nm and a second dielectric film 5 made of SiN having a thickness of 10 nm were sequentially deposited on the substrate 1. Then, a light transmission layer 6 was deposited on this second dielectric film 5. This light transmission layer 6 was formed by bonding polycarbonate sheets with a pressure sensitive adhesive (PSA). A thickness of this light transmission layer 6 was selected to be 100 μm including the PSA and the polycarbonates.

In the TiSi composition of the metal film 2, a composition of Si was selected to be 20 at. % (atomic %).

A composition of GeO of the oxide film 3 was selected to be Ge$_1$O$_x$ where x=1.8.

A composition of ZnS—SiO$_2$ of the first dielectric film 4 was selected to be 80:20 in ZnS:SiO$_2$ (atomic ratio).

The second dielectric film 5 was made of Si$_3$N$_4$.

Figures 3, 4:
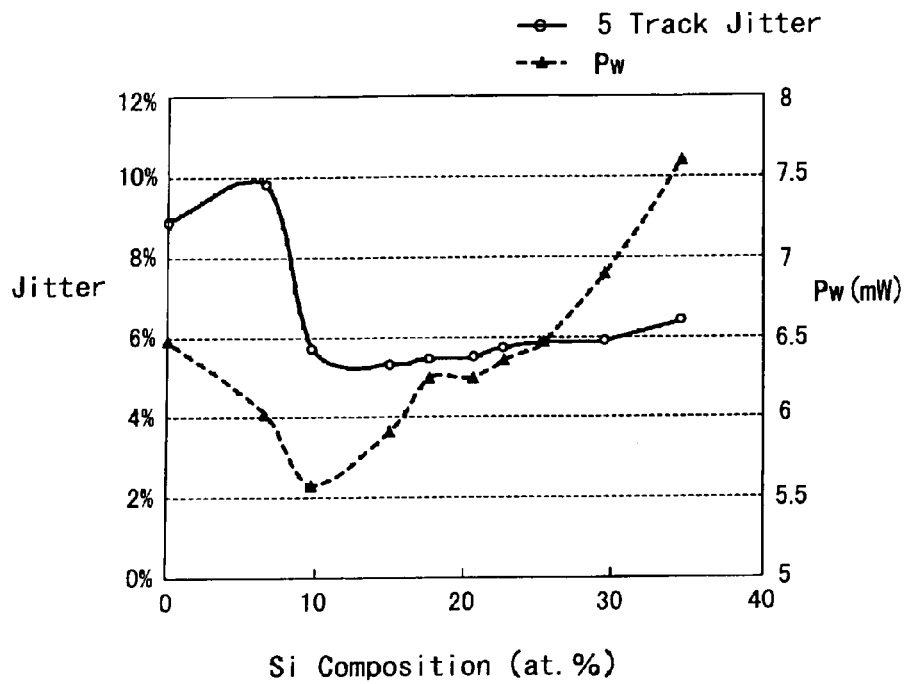
FIG. 3 is a diagram showing measured results of jitters and Si composition dependence of a metal film TiSi in recording power (recording sensitivity)
FIG. 4 is a table showing relationships obtained when film thicknesses of dielectric films of the write once optical recording medium according to the embodiment of the present invention and jitter values were measured.

FIG. 3 is a diagram showing recording and reproducing characteristics, that is, measured results of power Pw (recording sensitivity) of recording power and jitters obtained when the composition of TiSi of the metal film 2 in the arrangement of the write once optical recording medium 10 according to this inventive example 1.

In the standardized values of the BD write once optical recording medium (BD-R), since the jitter value is less than 6.5% and the recording sensitivity is 7.0 mW in the twice normal speed recording and in the recording density of 25 GB, the arrangement of the inventive example 1 may satisfy the standardized values.

Further, it is clear from those results that standards of jitter can be satisfied by selecting the Si composition of TiSi to be greater than 8 atomic %, recording sensitivity can be satisfied by selecting Si composition of TiSi to be less than 32 atomic % and that the BD-R having satisfactory characteristics can be manufactured by selecting Si composition of TiSi in a range of from 8 atomic % to 32 atomic %.

In the above-mentioned arrangement, the second dielectric film 5 of Si$_3$N$_4$ is provided to obtain a function of an isolation layer to prevent ZnS—SiO$_2$ of the first dielectric layer 4 and the PSA (pressure-sensitive adhesive) of the light transmission layer 6 from reacting each other, thereby being deteriorated. To this end, it is preferable that the film thickness of the second dielectric film 5 of SiN should be decreased as much as possible insofar as the function of this isolation layer may be maintained. It was confirmed that recording sensitivity and jitter are not changed at all until the thickness of the second dielectric film 5 was decreased to 8 nm.

When there is no risk that the second dielectric film 5 will react with the above-mentioned PSA, the PSA is not used as the light transmission layer 6, for example, and that a UV resin is used as the light transmission layer 6 or the light transmission layer 6 is used during a short period of time, the second dielectric film 5 may be omitted.

EXAMPLE 2

In the same arrangement as that of the inventive example 1, the film thickness of the first dielectric film was changed in a range of from 10 nm to 43 nm and the film thickness of the second dielectric film 5 was changed in a range of from 0 to 35 nm.

Then, the table 1 in FIG. 4 shows measured results of front end side jitter (leading jitter) and rear end side jitter of a recording mark obtained when the film thickness of the first dielectric film 4 was changed in a range of from 10 nm to 43 nm and the film thickness of the second dielectric film 5 was changed in a range of from 0 to 35 nm in the inventive example 2 and when the first dielectric film 4 is not provided and the film thickness of the second dielectric film 5 was selected to be 60 nm in the arrangement in the ranges other than this inventive example 2 for comparison.

A study of the measured results on the table 1 reveals that the leading jitter and the trailing jitter can be decreased to be less than 6.5% when the film thickness of the first dielectric film 4 was changed in a range of from 10 nm to 43 nm and the film thickness of the second dielectric film 5 was changed in a range of from 0 to 35 nm in the same arrangement of the inventive example 2 as that of the inventive example 1.

Specifically, it is clear that the jitter value is less than 6.5% in an extremely wide range with respect to the film thickness of the ZnS—SiO$_2$ of the first dielectric film 4, satisfactory recording can be carried out and, in particular, that characteristics are stable when the film thickness of the first dielectric film 4 is greater than 23 nm. Accordingly, the film thickness of ZnS—SiO$_2$ of the first dielectric film 4 is selected in the above range of from 10 nm to 43 nm or it should preferably be selected in a range of from 23 nm to 43 nm.

Then, as described above, since the film thickness of the first dielectric film 4 can be selected in a wide range, it is possible to optically select the optimum film thickness from the reflectance standpoint.

On the other hand, when the first dielectric film 4 is not formed and only the second dielectric film 5 is made of SiN, the jitter value is decreased 0.5% so that a range in which the jitter value of 6.5% of the standards may be satisfied is narrowed.

In other words, if the film thickness falls within the ordinary film thickness range, then when ZnS—SiO$_2$ is used as the dielectric film, such dielectric film of Zn—SiO$_2$ may be effective to improve recording and reproducing characteristics regardless of film thickness.

EXAMPLE 3

Figure 5:
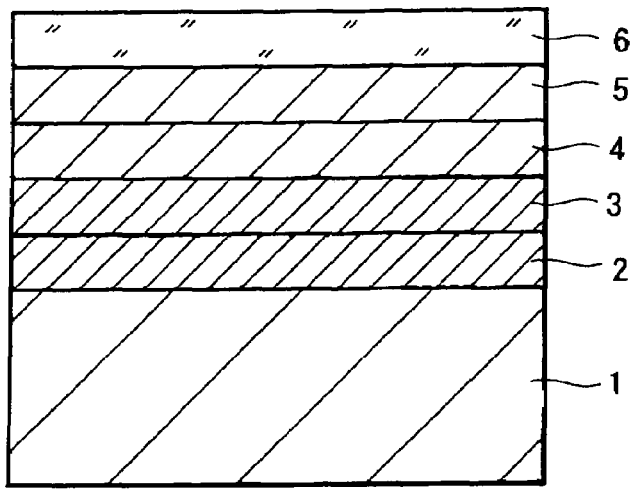
FIG. 5 is a diagram showing a film arrangement of the write once optical recording medium according to other embodiment of the present invention.

In this inventive example 3, as FIG. 5 shows its film arrangement, in the arrangement of the inventive example 1, the composition TiSi of the metal film 2, Si was selected to be 10 atomic %, the film thickness was selected to be 30 nm and the film thickness of the oxide film 3 was selected to be 10 nm.

Then, the film thickness of the first dielectric film 4 made of ZnS—SiO$_2$ was selected to be 30 nm and the film thickness of the second dielectric film 5 made of SiN was selected to be 10 nm.

EXAMPLE 4

Figure 6:
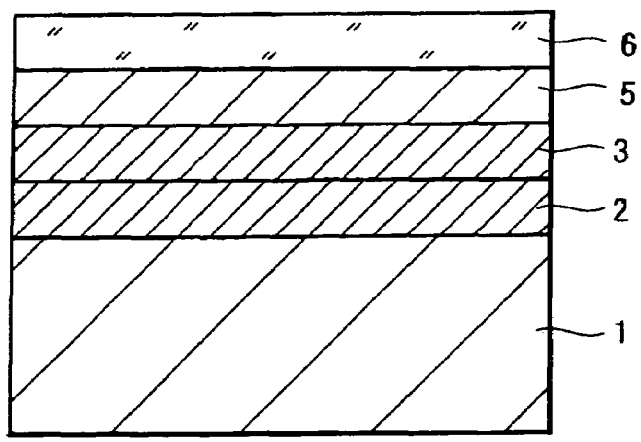
FIG. 6 is a diagram showing a film arrangement of the write once optical recording medium according to a further embodiment of the present invention.

In this inventive example 4, as FIG. 6 shows its film arrangement, a first dielectric film was not formed and only a second dielectric film 5 made of SiN having a film thickness of 60 nm was formed.

In the inventive examples 3 and 4, the write once optical recording mediums were designed such that their reflectance was both selected to be approximately 15% so that amounts in which light can be absorbed in the oxide film 3 and the metal film 2 may become substantially equal to each other.

Figure 7:
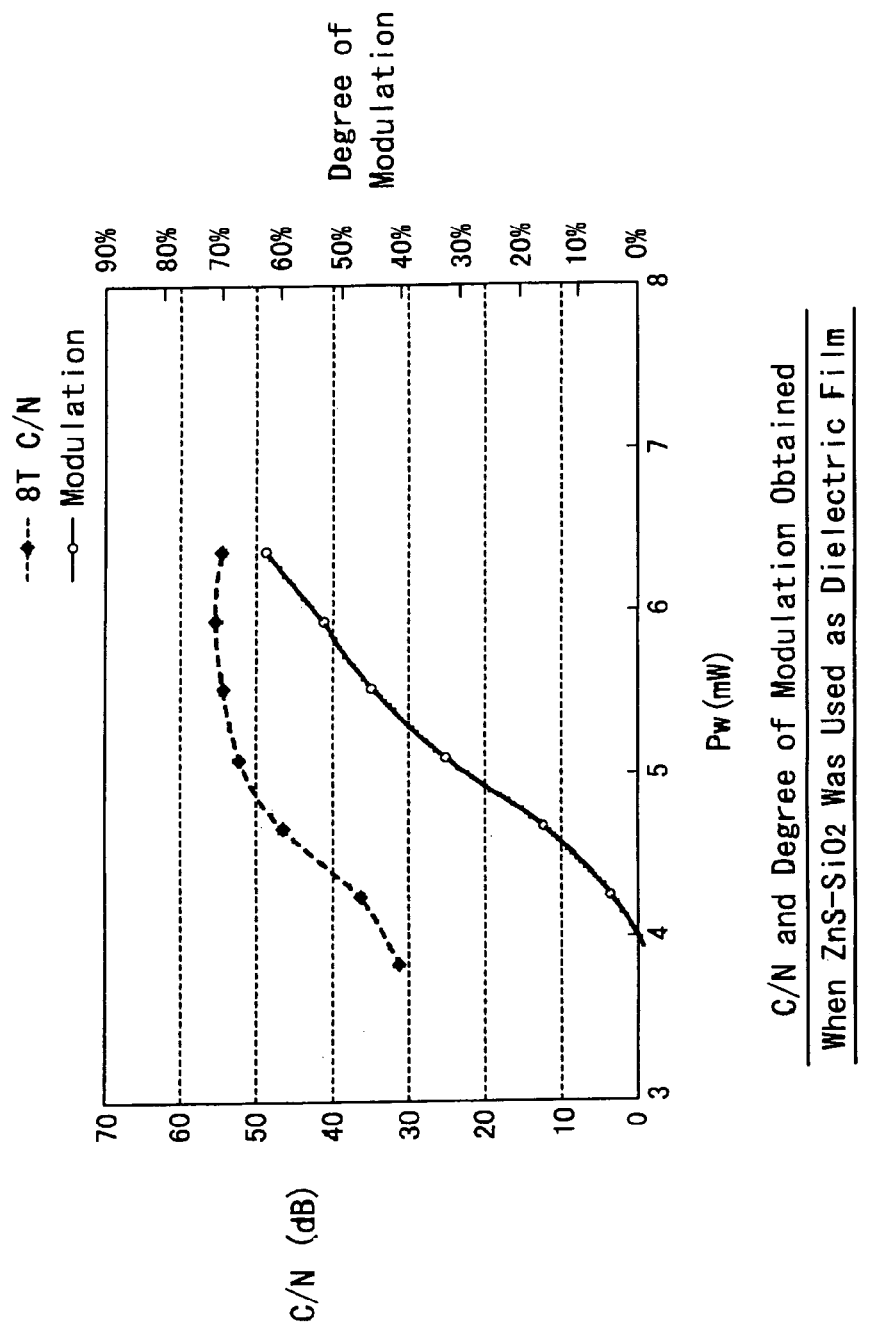
FIG. 7 is a diagram showing measured results of recording power dependence of C/N (carrier-to-noise ratio) and degree of modulation obtained when only SiN was used as a dielectric film in the inventive example 3.
Figure 8:
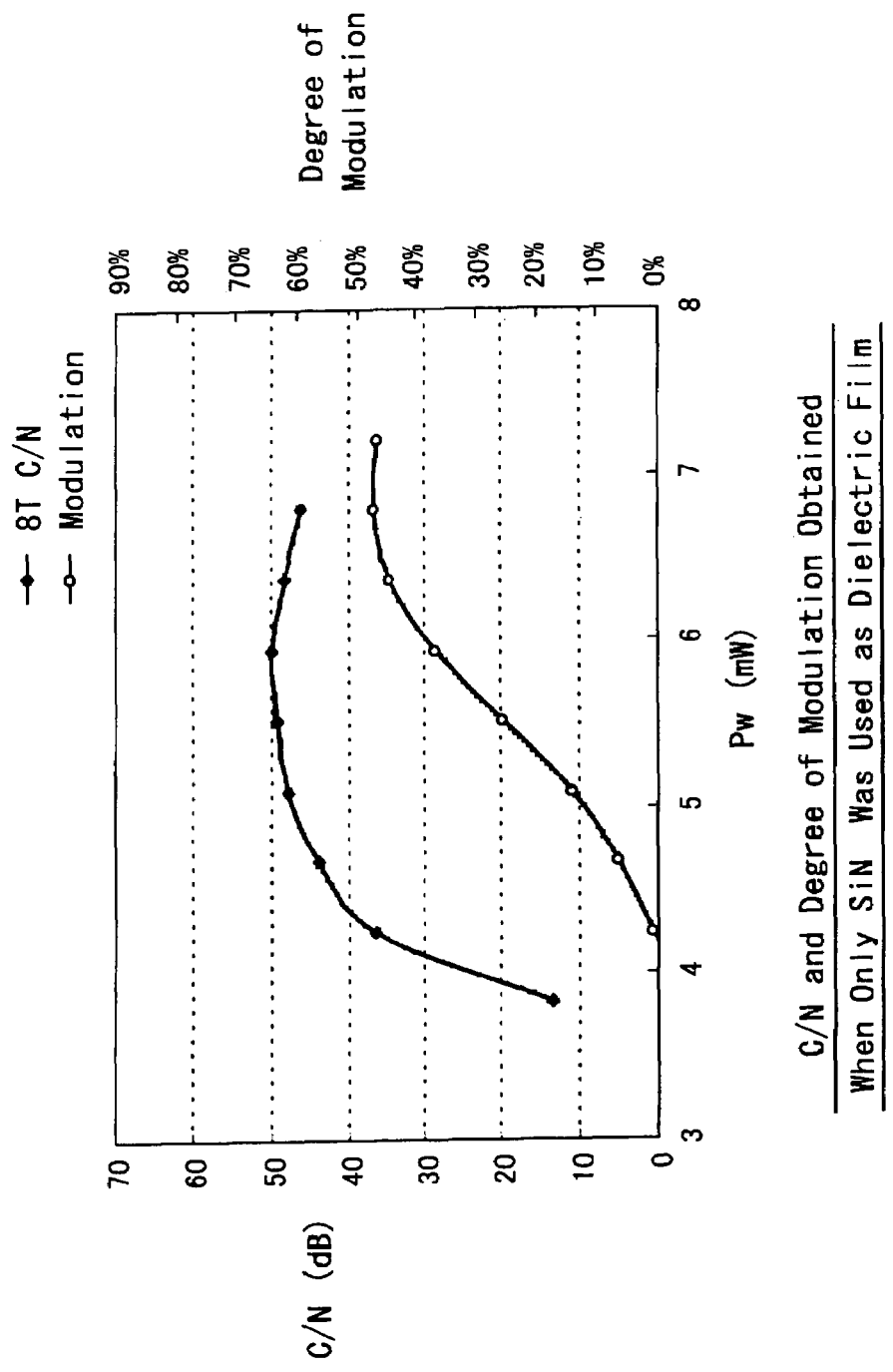
FIG. 8 is a diagram showing measured results of recording power dependence of C/N (carrier-to-noise ratio) and degree of modulation obtained when only SiN was used as a dielectric film in the inventive example 4.

FIGS. 7 and 8 are diagrams showing measured results of recording sensitivity [recording power Pw] dependence of C/N (carrier-to-noise ratio) and degree of modulation of the respective BD-Rs in the inventive examples 3 and 4.

According to the measured results of FIGS. 7 and 8, as compared with the case in which only SiN was formed as the dielectric film, the degree of modulation could be increased and the C/N could be increased in the BD-R in which the first dielectric film 4 made of ZnS—SiO$_2$ was formed.

As additives that are added to TiSi of the metal film 2 in order to improve durability and recording characteristics, there may be enumerated Cu, Pd, Ni, C, Cr, Fe, Mg, V, Ca, B, Nb, Zr, S, Se, Mn, Ga, Mo, Tb, Dy and Nd.

EXAMPLE 5

In this inventive example 5, while the film arrangement is made similar to that of the inventive example 1, Si composition of the TiSi metal film 2 was selected to be 20 atomic %.

Then, in this arrangement, influences exerted upon the characteristics, that is, influences exerted upon the jitter when oxygen composition x of Ge$_1$O$_x$ of the oxide film 3 was changed were measured. The table 2 in FIG. 9A shows measured results and FIG. 9B is a graph showing characteristic curves obtained when the above-mentioned measured results were plotted.

In the measurement of jitters, recording linear velocity was selected to be 2×(9.83 m/s).

Figures 9A, 9B:
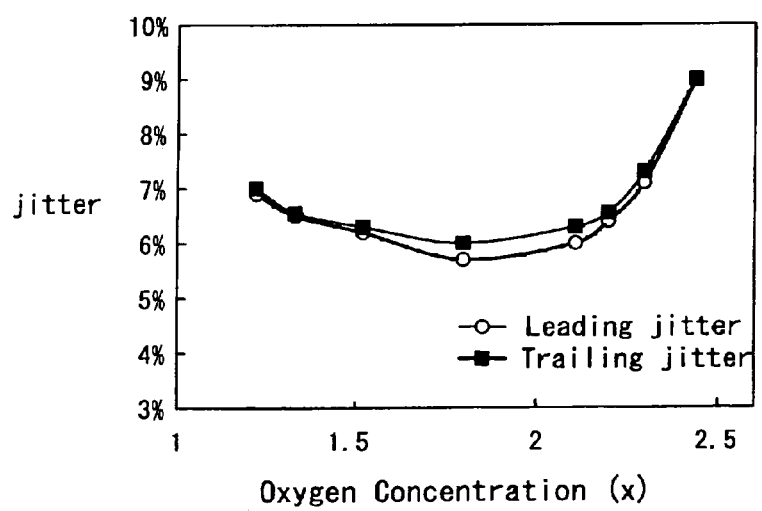
FIG. 9A is a table showing measured results of jitters obtained when oxygen concentrations of an oxide film of the write once optical recording medium according to the present invention were changed.
FIG. 9B is a diagram showing characteristic curves of jitters obtained in FIG. 9A.

From the measured results on FIGS. 9A and 9B, it is to be understood that the optimum range exists in the oxygen concentration of Ge$_1$O$_x$.

From the oxygen concentration preservation data of the measured results on the table 2, it is clear that the optimum range of the oxygen concentration that can satisfy 6.5% which is the standardized value of the jitter was selected in the following range:

$1.3 \leq x \leq 2.2$

That is, in the film arrangement of the present invention, when the Ge$_1$O$_x$ oxygen concentration was selected in a range of from $1.3 \leq x \leq 2.2$, it is possible to obtain the write once optical recording medium with satisfactory characteristics.

Next, in this write once optical recording medium, film thickness dependence of the film thickness of the metal film 2 and the film thickness of the oxide film 3 of its characteristic, in particular, jitter values were considered.

FIG. 10 shows the table 3 of the measured results.

In the write once optical recording medium of this measured data, the overall film arrangements was fundamentally selected to be the same as that of the inventive example 1.

In this case, since thermal characteristics of the recording film were changed in accordance with the film thickness, shapes (width, timing and power) of optimum recording pulse were changed. Accordingly, jitter values were optimized in response to respective mediums and only optimum jitter values received an attention and they were measured. Measured results are shown on the table 3 of FIG. 10.

According to the measured results on the table 3, only in the illustrated inventive example, since the jitter values are remarkably under 6.5% of the standard value when the film thickness of the metal film 2 falls within a range of from 20 nm to 27 nm and the film thickness of the oxide film 3 falls within a range of from 16 nm to 22.5 nm. Hence, it is to be understood that a margin relative to the film thickness is extremely large.

As a consequence, it is possible to realize the excellent write once optical recording medium with the film arrangement of the present invention in accordance with suitable factors such as reflectance, sensitivity and optical system.

As is clear from the above, according to the present invention, it is possible to construct the write once optical recording medium with excellent characteristics as the high-density recording BD-R with short wavelength and high numerical aperture which can meet with requirements of the Blu-ray Disc.

Then, in the inorganic recording film arrangement, the number of layers can be suppressed to three or four layers and hence a manufacturing cost can be decreased.

Also, if the light transmission layer 6 has the PSA/resin sheet arrangement as in the inventive examples, such light transmission layer 6 may have excellent characteristics. Thus, it is possible to construct the write once optical recording medium with stable preservation property and with excellent durability, for example, BD-R.

It should be understood by those skilled in the art that various modifications, combinations, sub-combinations and alterations may occur depending on design requirements and other factors insofar as they are within the scope of the appended claims or the equivalents thereof.

The invention claimed is:

1. A write once optical recording medium including an inorganic recording film, the inorganic recording film comprising:
    an oxide film having germanium oxide (GeO) as a principal component thereof; and
    a metal film adjacent to the oxide film and having a titanium/silicon alloy (TiSi) as a principal component thereof,
    in which the titanium/silicon alloy has an Si composition of from 8 atomic % to 32 atomic %.

2. A write once optical recording medium according to claim 1, wherein the germanium oxide in the oxide film has the composition Ge$_1$O$_x$, where $1.3 \leq x \leq 2.2$.

3. A write once optical recording medium according to claim 2, further comprising a first dielectric film disposed adjacent to the oxide film on a side opposite the metal film.

4. A write once optical recording medium according to claim 3, wherein the first dielectric film is formed of ZnS—SiO$_2$.

5. A write once optical recording medium according to claim 3, further comprising a second dielectric film disposed adjacent to the first dielectric film on a side opposite the oxide film, the first dielectric film being formed of ZnS—SiO$_2$ and the second dielectric film being formed of SiN.

* * * * *